March 2, 1965     C. P. COLDREN     3,171,460
NUT AND SPLIT WASHER ASSEMBLY
Filed Nov. 8, 1961     2 Sheets-Sheet 1
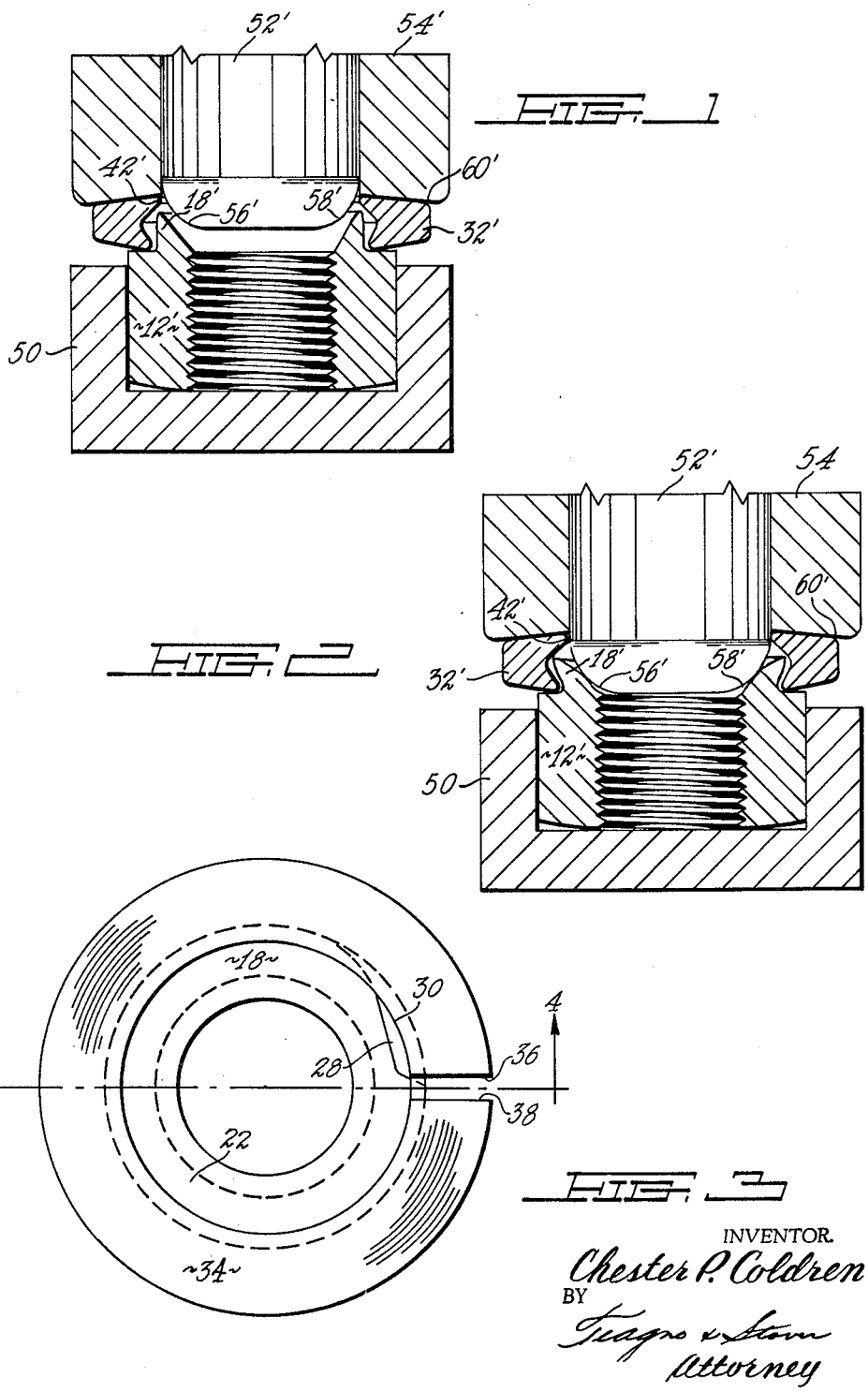
INVENTOR.
Chester P. Coldren
BY
Attorney March 2, 1965  C. P. COLDREN  3,171,460
NUT AND SPLIT WASHER ASSEMBLY Filed Nov. 8, 1961  2 Sheets-Sheet 2

INVENTOR.
Chester P. Coldren
BY
Teagno & Stover
Attorney of this invention will be apparent from the following description taken

United States Patent Office
3,171,460
Patented Mar. 2, 1965

3,171,460
NUT AND SPLIT WASHER ASSEMBLY
Chester P. Coldren, Canton, Ohio, assignor to Eaton Manufacturing Company, Cleveland, Ohio, a corporation of Ohio
Filed Nov. 8, 1961, Ser. No. 150,945
3 Claims. (Cl. 151—37)

This invention relates to a threaded nut and helical split lockwasher assembly.

An object of this invention is to provide a pre-assembled threaded nut and helical spring washer wherein pre-assembly of the component parts is insured by the novel structural configuration of the nut and helical washer.

Another object of this invention is to provide a pre-assembled nut and helical washer assembly wherein the helical washer is maintained in a substantially free shape so that the washer does not lose its reactive range while pre-assembled to the nut and before the assembly is ultimately applied in a work environment.

Still another object of this invention is to provide a pre-assembled nut and helical washer assembly wherein the washer is free to turn with respect to the nut during the last turn or a portion of the last turn prior to complete securement upon application in a work environment.

These and other objects and advantages of this invention will be apparent from the following description taken in connection with the accompanying drawings wherein:

FIGURE 1 is a cross-sectional view of the novel nut and helical washer assembly during an intermediate stage of manufacture.

FIGURE 2 is a cross-sectional view of the novel nut and helical washer assembly after a staking tool has assembled the components into a unitary assembly.

FIGURE 3 is an enlarged plan view of the novel nut and helical washer assembly.

Figure 4:
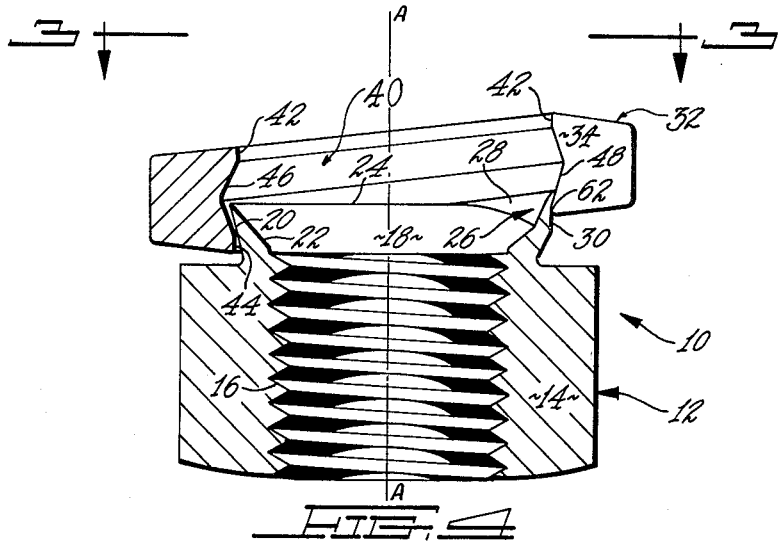
FIGURE 4 is a cross-sectional view taken along line 4—4 of FIGURE 3.

Referring to the drawing for a more detailed description of the novel structure disclosed herein, FIGURE 4 illustrates fastener or securing means in the form of a threaded nut and helical lockwasher assembly 10 comprising a nut 12 having a body portion 14 provided with a threaded portion 16 along an inner annular surface thereof. An annular staking flange 18 is formed integral with nut body 14 and extends generally axially outwardly therefrom and is comprised of an outer annular surface portion 20 and an inner annular surface portion 22 which converge with respect to each other and diverge relative to the longitudinal axis A—A of the assembly 10 and terminate in aligned surface 24. A further portion of annular staking flange 18 is comprised of an upset lip portion 26 having an inner surface portion 28 and an outer surface portion 30. The details of the upset lip and its cooperation with the detailed configuration of a lockwasher 32 will be hereinafter described in greater detail.

The lockwasher 32 forms a part of fastener assembly 10 and is comprised of a helically wound wire body section 34 which terminates in end portions 36 and 38, note FIGURE 3.

An internal surface portion 40 of lockwasher 32 is comprised of an upper annular wall surface 42, a lower annular wall surface 44 and a nut staking flange receiving recess 46 disposed axially intermediate of annular wall surfaces 42 and 44. Nut staking flange receiving recess 46 includes a flange retaining wall surface 48 which is disposed substantially complementary with the outer surface portion 20 of the annular flange 18 of the nut body 14 and cooperates with the upset lip portion 26 thereof in a novel manner to retain washer 32 in assembly with nut 12.

In order to adequately describe the configuration of the cooperating portions of the nut and washer of the instant novel fastener assembly, it is appropriate to disclose and describe the method by which the nut and washer are assembled to form a unitary fastening device. Referring to FIGURE 1, a nut retaining recess 50 confines a partially finished nut blank 12' orientated in position with respect to a washer feeding pin 52' and a plunger 54'. Washer feeding pin 52' is provided with a staking tip portion 56' having a rounded surface portion 58' thereon. When nut blank 12' is moved under or in axial alignment with the washer feeding pin 52' and plunger 54', it is in position to receive a lockwasher 32' frictionally carried on washer feeding pin 52' by an upper annular wall surface 42' on the lockwasher 32'. During this stage of assembly, plunger 54' is in an upward position with respect to the position shown in FIGURE 1 and upon downward movement of plunger 54' with respect to washer feeding pin 52' by suitable actuating means (not shown), a washer engaging portion 60' of plunger 54' moves lockwasher 32' downwardly on the washer feeding pin 52' until lockwasher 32' is moved to the position shown in FIGURE 1. Subsequently, washer feeding pin 52' is moved downwardly to the position shown in FIGURE 2 at which time annular staking flange 18' is upset by staking tip portion 56' of feeding pin 52' to the configuration shown in FIGURE 2. At this point in the assembly, an upset lip has not as yet been formed and the annular staking flange is a continuous flange of uniform cross-section.

The final step of assembly is performed when washer feeding pin 52' is moved upwardly to a position where it completely clears lockwasher 32'. However, plunger 54' is still biasing lockwasher 32' in a flat position as shown in FIGURES 1 and 2. Plunger 54' is then moved upwardly with respect to lockwasher 32' allowing the lockwasher to return to its normal helical shape. In order to form the upset lip portion 26 on the nut blank 12' the disclosed procedure is to allow one end portion of the lockwasher 32' to engage, upset or in some way displace a portion of the material of the annular flange 18' during the upward movement of the plunger 54' relative to the nut blank 12' with such engagement, upsetting or displacement being effective to permanently deform the annular flange 18' and thus create the upset lip portion 26. The nut and lockwasher assembly may then be removed from the assembly fixture.

It is to be clearly understood that the method of manufacturing or of assembling the fastener assembly forms no part of the instant inventive concept and that other methods such as casting, machining or any other known processes may be employed with the general swaging operation as briefly described and disclosed above being one possible process which might be employed.

It has heretofore been known in the art to provide a nut and lockwasher assembly wherein the nut is provided with a flange and the inside diameter portion of the lockwasher is provided with a V-section. However, such known nut and lockwasher assemblies have been designed whereby the flange on the nut is pre-formed to a permanent particular configuration through drawing, machining, or other suitable operation and the lockwasher is thereafter assembled to the flanged nut by spreading the ends thereof over the nut flange either by prespreading the washer, distorting or "popping" it over the nut flange by an appropriate fixture or assembly device. With such known arrangements, upon assembly, the raised or free end of the helical lockwasher is positioned to ride over a portion of the nut flange. Once the free end of the washer has cleared the flange, the greater portion of the washer inner diameter is rolled or spread thereover whereby the washer is assembled to the nut. The rolling step is readily accomplished due to the predetermined dimension of the inner diameter of the washer being larger at a portion thereof than the diameter of the flange. Accordingly, assembly of the members amounts to lateral movement of the washer with respect to the flange and the axis of the nut provided by the larger dimension of the washer inner diameter until the majority of the washer has been rolled onto the flange. With such an arrangement, the washer can easily become disassembled with respect to the nut by re-sliding over the flange on the nut. It is inherent in such a known assembly that the mean diameter of the lockwasher is greater with respect to the major dimension of the flange than the novel assembly herein disclosed.

The novel fastener assembly disclosed herein is provided with a positive means to insure that lockwasher 32 will be retained in assembly with nut 12 by provision of upset lip 26. Referring to FIGURE 4, the lower annular wall surface 44 of lockwasher 32 is in biased frictional contact at 62 with outer surface portion 30 of upset lip 26. With the provision of this novel structure, lockwasher 32 is prevented from relative rotation with respect to nut 12 when the assembly is in the free state as shown in FIGURE 4. It is important to note that the arcuate length of upset lip 26 is not limited to any critical arcuate dimension with respect to the total circumferential length of annular staking flange 18 but such upset lip 26 can be of an arcuate length to describe and include an angle measured from the center of the lockwasher of not greater than 170°. In determining the minimum angle described by upset lip 26, it is only necessary to insure that an outer surface portion 30 of upset lip 26 be provided for frictional contact with lower annular wall surface 44 at 62.

Figure 5:
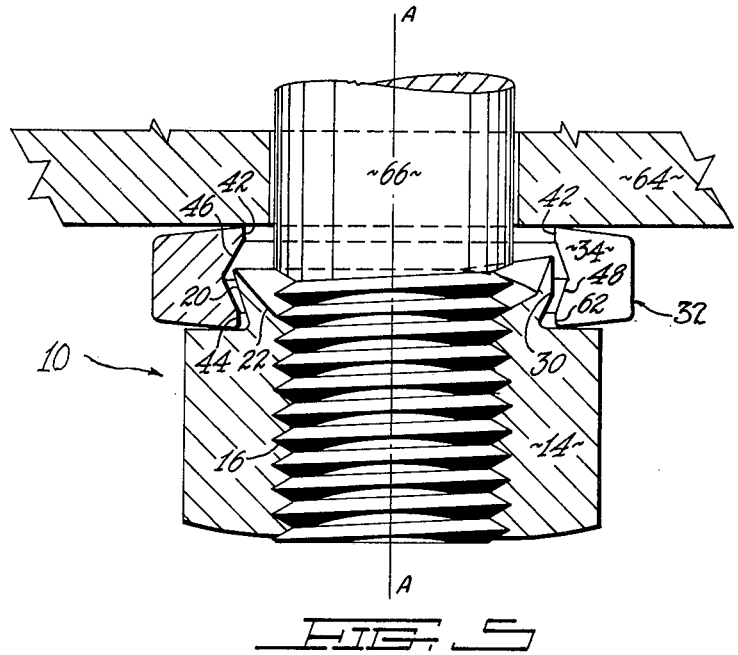
FIGURE 5 is a cross-sectional view of the novel nut and helical washer assembly as applied in a work environment.

Referring to FIGURE 5, a fastener assembly 10 is shown in a work applied position on an appropriate workpiece 64. A threaded bolt or stud end portion 66 is shown extending or protruding into an opening formed in workpiece 64. Nut 12 is illustrated as being threadingly mounted on bolt end 66 and positioned so that lockwasher 32 is in a flattened or planar position with respect to the workpiece. It is noted that during this applied condition, annular flange 18 is spaced at all points with respect to lockwasher 32. This arrangement insures that during the last portion of the last turn of nut 12 with respect to bolt or stud 66, the nut can rotate with respect to lockwasher 32 while the lockwasher is retained in a fixed angular position with respect to the workpiece.

Another important aspect of this invention is that the novel assembly disclosed herein is a reusable nut and lockwasher assembly even after repeated applications to the workpiece. For example, upon removal from the workpiece, if the lockwasher is not circumferentially orientated with respect to the nut as it was during original assembly, the lockwasher will merely form a new upset lip 26 which prevents the nut and lockwasher from becoming disassembled.

In summary, this arrangement of parts in the disclosed novel nut and lockwasher assembly insures that the nut and lockwasher will not become disassembled during shipment or handling of the fastener assembly at any time.

While the present invention has been described in connection with certain specific embodiments, it is to be understood that the foregoing description is merely exemplary and that the concept of this invention is susceptible of numerous other modifications, variations, and applications which will be apparent to persons skilled in the art. The invention is to be limited, therefore, only by the broad scope of the appended claims.

I claim:
1. A fastener assembly comprising
securing means having a threaded portion thereon,
an annular staking flange disposed adjacent said threaded portion,
said staking flange having inner and outer annular wall surface portions which extend generally axially outwardly from the securing means in diverging relationship relative to the longitudinal axis thereof and converging relationship with respect to each other,
a lip portion formed integral with the staking flange and projecting therefrom in a direction generally toward the longitudinal axis of the securing means,
said lip portion terminating at a location generally axially beyond the remainder of said staking flange and extending arcuately therealong for a length of not more than 170°, and
a split helical lockwasher having a major portion thereof disposed in axially overlapping relationship with respect to the staking flange,
said lockwasher comprising
a staking flange retaining wall surface disposed intermediate upper and lower annular wall surfaces,
said retaining wall surface having a portion thereof inclined substantially complementary to the outer annular wall surface portion of the staking flange,
the staking flange retaining wall surface of that end portion of the lockwasher which is furthest from the securing means being disposed in frictional engagement with the lip portion of the staking flange to bias the lockwasher against rotation relative to the securing means.

2. The fastener assembly as set forth in claim 1 wherein said securing means is in the configuration of a nut with the threaded portion thereof being an internally threaded bore which extends therethrough.

3. A fastener assembly comprising
securing means having a threaded portion thereon,
an annular flange disposed adjacent said threaded portion,
said flange having an outer annular wall surface which extends generally axially outwardly from the securing means in diverging relationship relative to the longitudinal axis thereof,
a lip portion formed integral with the flange and projecting therefrom in a direction generally toward the longitudinal axis of the securing means,
said lip portion terminating at a location generally axially beyond the remainder of said flange and extending arcuately therealong for a length of not more than 170°, and
a split helical lockwasher having a major portion thereof disposed in axially overlapping relationship with respect to the flange,
said lockwasher comprising
a flange retaining wall surface having a portion thereof inclined substantially complementary to the outer annular wall surface of the flange,
the flange retaining wall surface of that end portion of the lockwasher which is furthest from the securing means being disposed in frictional engagement with the lip portion of the flange to prevent rotation of the lockwasher relative to the securing means.

References Cited by the Examiner
UNITED STATES PATENTS

| 1,793,141 | 2/31 | Stoll | 151—36 |
| 1,883,068 | 10/32 | Stoll | 151—37 |
| 2,687,758 | 8/54 | Pipes | 151—37 |
| 2,779,375 | 1/57 | O'Connor | 151—37 |

FOREIGN PATENTS 662,175   12/51   Great Britain.

EDWARD C. ALLEN, *Primary Examiner.*
CARL W. TOMLIN, *Examiner.*